United States Patent [19]

Crawford

[11] 3,963,089

[45] June 15, 1976

[54] DIFFERENTIAL MOUNTING AND WHEEL DRIVE ARRANGEMENT

[75] Inventor: John T. Crawford, Lyndhurst, Ohio

[73] Assignee: Towmotor Corporation, Mentor, Ohio

[22] Filed: June 2, 1975

[21] Appl. No.: 583,029

[52] U.S. Cl. .......... 180/75; 180/88

[51] Int. Cl.[2] .......... B60K 17/16

[58] Field of Search .......... 180/70 R, 75, 88, 54 E, 180/55-57, 62; 214/674; 74/607; 187/9 R; 280/106; 301/125

[56] References Cited

UNITED STATES PATENTS

| | | | |
|---|---|---|---|
| 2,299,445 | 10/1942 | Weaver | 180/54 E |
| 2,410,133 | 10/1946 | Spatta | 180/75 |
| 2,625,285 | 1/1953 | Weaver | 214/674 |
| 2,776,019 | 1/1957 | Keese | 180/75 |
| 2,804,984 | 9/1957 | Ulinski | 180/75 X |
| 3,041,890 | 7/1962 | O'Brien | 180/88 X |
| 3,662,849 | 5/1972 | Bostad | 180/88 |
| 3,820,618 | 6/1974 | DePauw | 180/70 R |

*Primary Examiner*—Kenneth H. Betts
*Attorney, Agent, or Firm*—John W. Grant

[57] ABSTRACT

An axle beam has a pair of side plates individually secured to the ends of a pair of vertically spaced upper and lower plates and a vertically disposed plate secured to the forward edges of the upper and lower plate. A pair of wheel drive gears are individually journalled on a pair of spindles individually secured to the outer surfaces of the side plates with the spindles having a horizontal axis extending therethrough. A differential disposed within the axle beam is secured to one of the plates and has a pair of jackshafts extending outwardly from its opposite sides. Each jackshaft extends through an aperture formed in the side plate and has a gear formed on its distal end mating with the respective wheel drive gear. The jackshafts and apertures are radially offset from the horizontal axis a predetermined distance as determined by the mating relation between the gears such that said apertures are located in one of a plurality of positions which are disposed on a pair of diametrically opposite arcs of a circle having the horizontal axis of the spindle as its center and the predetermined distance as its radius, with one of the arcs being disposed forwardly of the horizontal axis.

5 Claims, 5 Drawing Figures

DIFFERENTIAL MOUNTING AND WHEEL DRIVE ARRANGEMENT

BACKGROUND OF THE INVENTION

This invention relates to a fork lift truck, and more particularly to a differential mounting and wheel drive arrangement which permits mounting the differential at various locations relative to the axis of the wheel.

The design of a particular fork lift truck is usually a compromise of many factors which affect the stability handling and maneuverability of the truck. For example, some lift trucks have a short wheel base for maximum maneuverability within a confined base, while other lift trucks have a longer wheel base for greater stability. Another factor is the location of the drive train, i.e., engine, transmission and differential, since these components contribute greatly to the mass which counterbalances the load lifted by the lift trucks. For short wheel base trucks, the center of gravity of the drive train is closer to the centerline of the front wheels than that of a longer wheel base truck. The vertical position of the drive line center of gravity also affects the stability and is normally a compromise between stability and ground clearance and may be dictated by the type of tires, i.e., cushion or pneumatic, used on the lift truck. Thus, several similarly sized lift trucks may have the same power requirements and a basic drive train may be employed or such similar machines. However, each particular lift truck design requires its own drive train mounting and one of the problems in the manufacturing of the lift trucks is that of providing maximum use of common basic components for similar vehicles to reduce the manufacturing costs and inventory of an assortment of configurations.

OBJECTS OF THE INVENTION

Accordingly, an object of this invention is to provide an improved differential mounting and wheel drive arrangement which may be employed for several similarly sized lift trucks.

Another object of this invention is to provide such an improved differential mounting and wheel drive arrangement which permits positioning of the differential either forwardly or rearwardly of the centerline of the drive wheel.

Another object of this invention is to provide such an improved differential mounting and wheel drive arrangement which utilizes a common, basic axle beam structure for several similarly sized lift trucks.

Other objects and advantages of this invention will become more readily apparent upon reference to the accompanying drawings and following description.

DESCRIPTION OF THE PREFERRED EMBODIMENT

Figure 1:
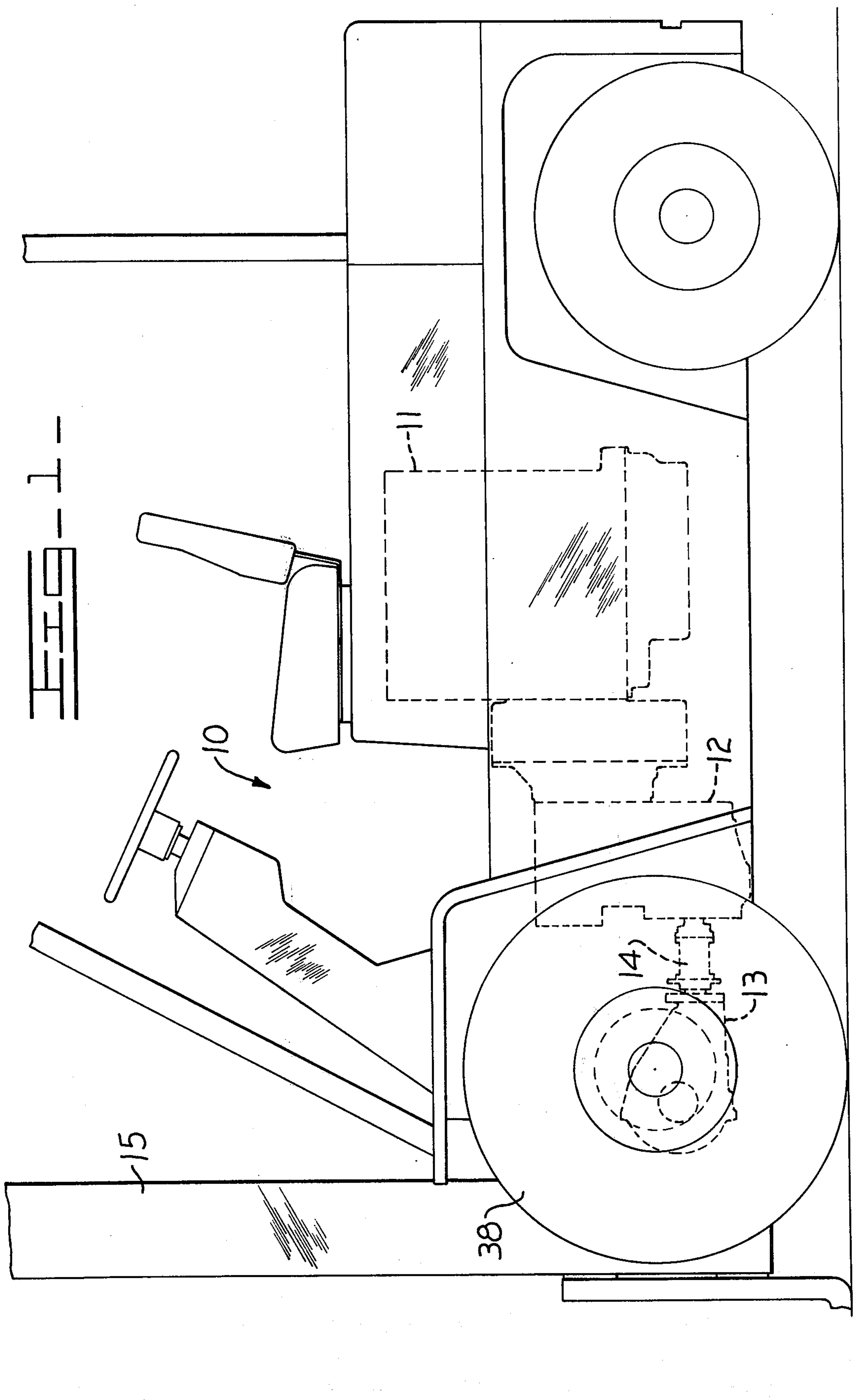
FIG. 1 is a side elevational view of a lift truck illustrating one position of a differential relative to the drive wheels.

Referring now to the drawings, a fork lift truck is generally indicated by the reference numeral 10 and includes an engine 11 and a transmission 12 mounted therein in the usual manner for powering a differential 13 through a short drive shaft 14. A lift mast assembly 15 is mounted on the forward end of the truck.

Figure 2:
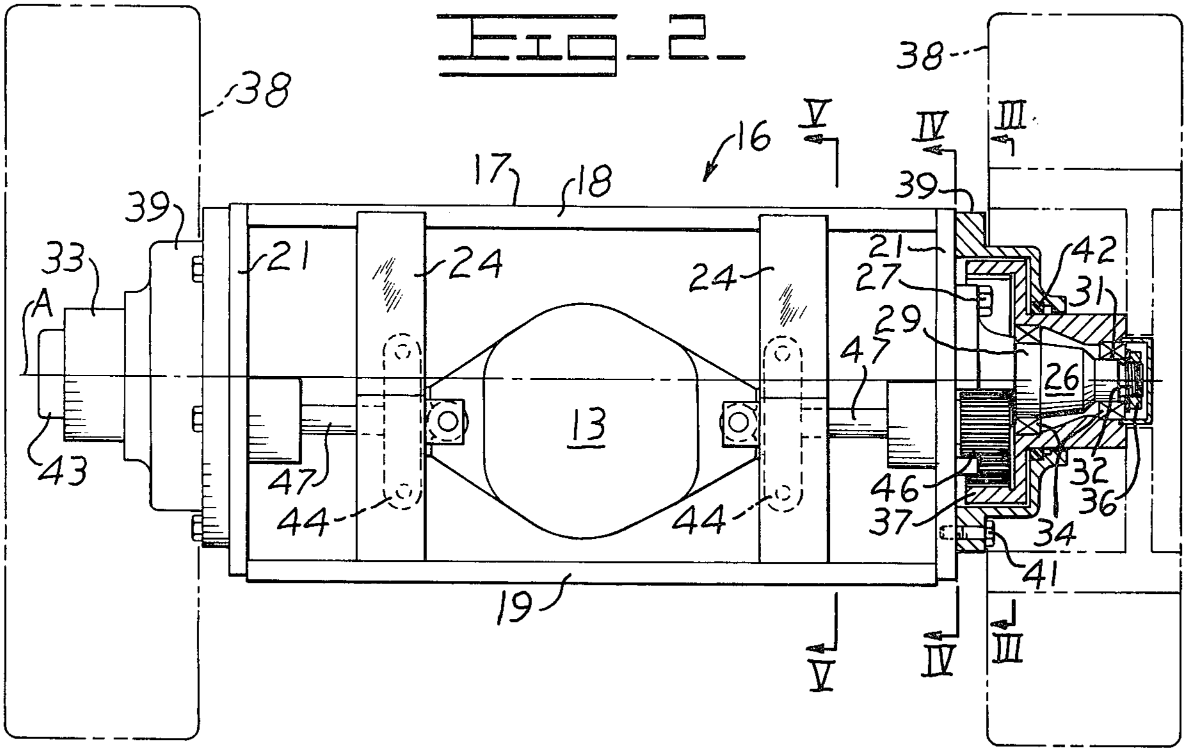
FIG. 2 is a front elevational view of the differential mounting and wheel drive arrangement embodying the principles of the present invention with portions in section for illustrative convenience.
Figure 3:
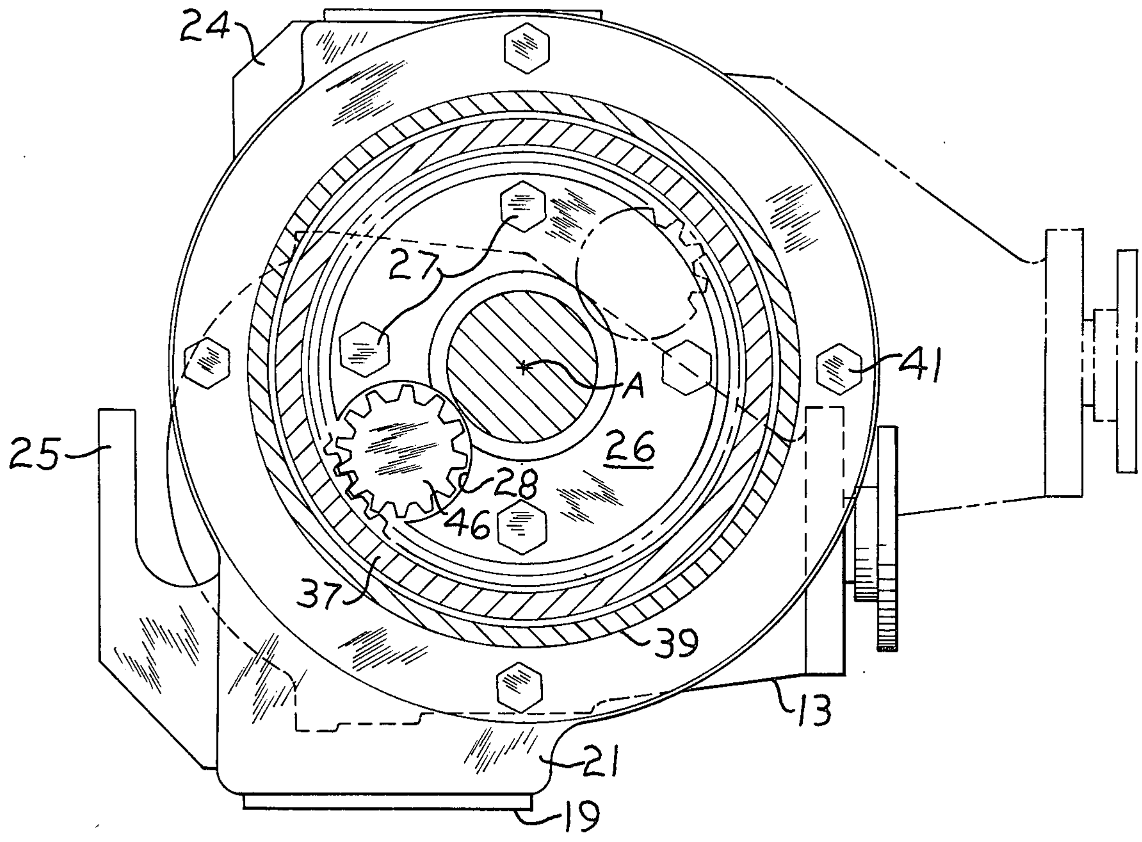
FIG. 3 is an enlarged sectional view taken along line III—III of FIG. 2.
Figure 4:
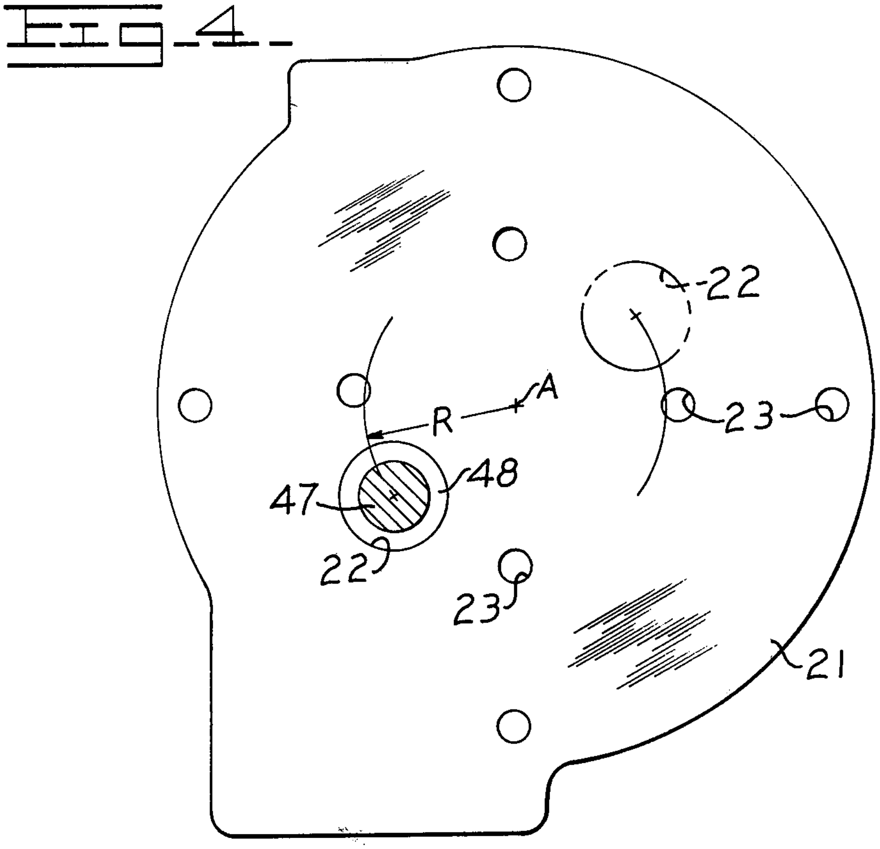
FIG. 4 is a sectional view taken along line IV—IV of FIG. 2.
Figure 5:
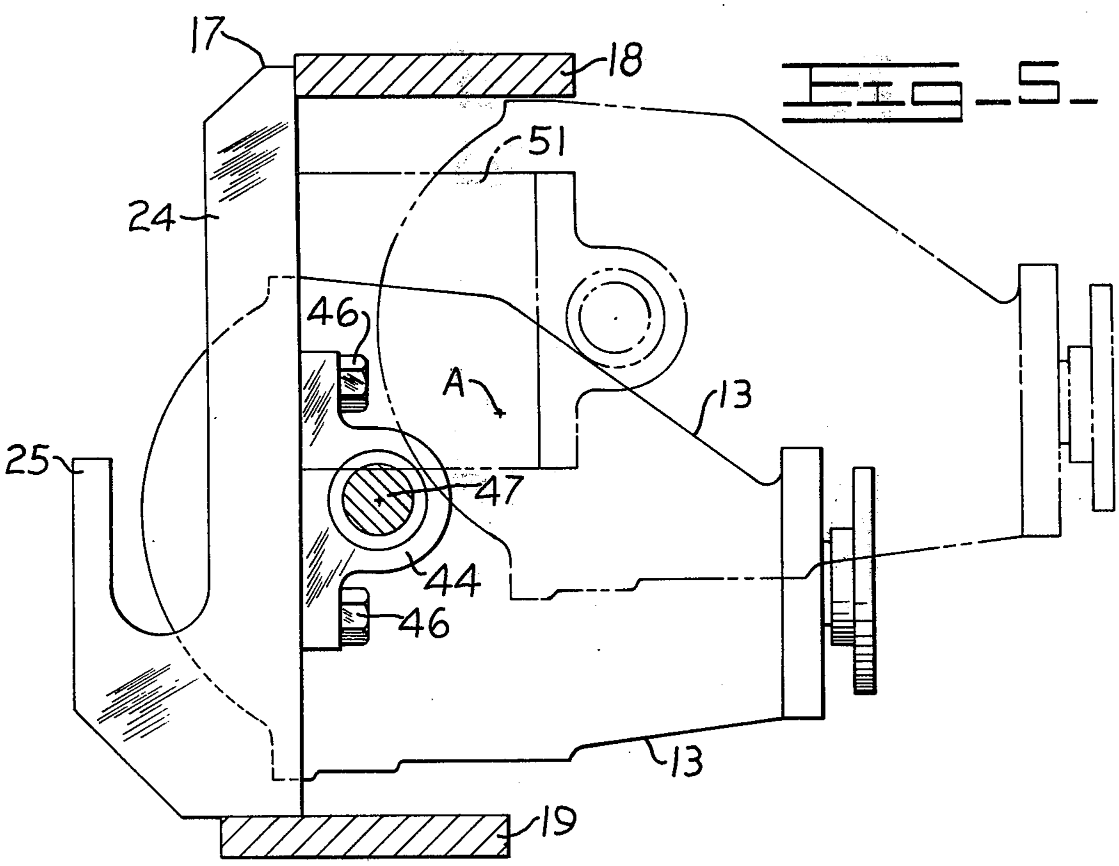
FIG. 5 is a sectional view taken along line V—V of FIG. 2.

As more clearly shown in FIGS. 2 and 3, a differential mounting and wheel drive arrangement embodying the principles of the present invention is generally indicated by the reference numeral 16 and includes a fabricated axle beam 17 transversely disposed at the forward end of the lift truck. The axle beam includes a pair of transversely disposed vertically spaced elongated upper and lower plates 18 and 19, respectively. A pair of side plates 21 are individually secured to the adjacent ends of the upper and lower plates. As shown in FIGS. 4 and 5, each plate has an aperture 22 and a plurality of threaded holes 23, extending therethrough. A pair of vertically oriented differential support plates 24 are secured to the forward edges of the upper and lower plates and are disposed inwardly from the side plates. Each support plate has a hook 25 formed thereon for receiving the mast assembly mounting, not shown.

A pair of wheel spindles 26 are individually secured to the outer surface of each of the side plates by a plurality of bolts 27 screw threaded into the threaded holes and have a horizontally disposed axis A extending therethrough. The horizontal axis is disposed rearwardly of the vertical plates 24. The spindle has a recess 28 formed therein in alignment with the aperture 22 in the side plate. A pair of axially spaced, reduced diameter portions 29 and 31 and an externally threaded portion 32 are formed on the wheel spindle concentric with the horizontal axis. An annular hub 33 is rotatably mounted on each of the wheel spindles by a pair of bearings 34 and secured to the spindle with a nut 36 screw threaded onto the threaded portion. A wheel drive gear in the form of an internal ring gear 37 is formed in the hub as an integral part thereof and is disposed adjacent to the side plate. A wheel indicated by the dashed lines in FIG. 2 at 38 is suitably secured to the end of the hub in the usual manner. An annular cover 39 is secured to the outer surface of the side plate concentric with the horizontal axis by a plurality of bolts 41. The cover carries a seal 42 which seals against the peripheral surface of the hub. A dust cover 43 is secured to the end of the hub and cooperates with the seal to provide a sealed environment for the ring gear and bearings.

The differential 13 is disposed generally within the axle beam and is secured to the vertical support plates by a pair of brackets 44, each of which is fastened to its respective vertical plate by a pair of bolts 46. Each of a pair of jackshafts 47 extends horizontally outwardly from the differential and through a bearing 48 disposed within the aperture 22 in the side plate 21. A gear 49 is formed on the distal end of each jackshaft and meshes with the ring gear 37 for driving the hub 33 and wheel 38. The gear is positioned within the recess 28 of the wheel spindle 26. For purposes of the present invention, the centerline of the differential is the same as the center of the jackshafts.

The apertures 22 formed in the side plates 21 and the jackshafts 47 extending outwardly from the differential 13 are offset radially from the horizontal axis A a predetermined distance as determined by the sizes and meshing relation of the gears 37 and 49. The differential is positioned by the brackets so that the jackshafts are in alignment with the apertures. When the axle beam 17 is employed in one particular lift truck design, the apertures 23 are machined in the position shown by the solid lines in FIG. 4. In such position, the apertures are disposed forwardly of the horizontal axis and rearwardly of the vertical plates 24.

However, when the axle beam 17 is employed in other lift truck designs, each of the apertures 22 is located in one of a plurality of positions which are disposed on a pair of diametrically opposed arcs of a circle which has the horizontal axis A of the spindle 26 as its center and the predetermined distance that the aperture is offset from the axis as its radius R. One such position is shown by the broken line position in FIGS. 4 and 5 wherein the apertures and jackshafts are disposed rearwardly of and above horizontal axis.

Since the jackshafts 47 extending outwardly from the differential 13 must be aligned with the apertures 22, the differential is positioned within the axle beam in accordance with the location of the aperture such as shown by the broken line position of the differential in FIGS. 3 and 5. With the differential in the broken line position, a spacer 51 is disposed between each of the brackets 44 and its respective vertical support plates 24. The wheel spindles 26 may also be positioned so that the recess 28 is aligned with the apertures.

In view of the foregoing, it is readily apparent that the structure of the present invention provides an improved differential mounting and wheel drive arrangement which may be used for a variety of similarly sized lift trucks. This is accomplished by mounting the wheel spindle to the axle beam so that the horizontal axis extending through the spindle is disposed rearwardly of the vertical plates of the axle beam. This permits the aperture, through which the jackshafts extend, to be machined within the side plate either forwardly or rearwardly of the horizontal axis. Thus, the differential may be mounted within the axle beam in a multiplicity of positions to permit the basic axle beam structure to be used on several similarly sized trucks by preselecting the position at which the apertures are machined.

What is claimed is:

1. A differential mounting and wheel drive arrangement comprising;

an axle beam having a pair of vertically spaced upper and lower plates, a pair of side plates individually secured to the ends of the upper and lower plates with each side plate having an aperture extending therethrough, and a vertically disposed plate secured to the forward edges of the upper and lower plates;

a pair of spindles individually secured to the outer surfaces of the side plates and having a horizontal axis extending therethrough;

a pair of wheel drive gears individually journaled on the spindles;

a differential disposed within the axle beam and secured to one of the plates; and a pair of jackshafts extending outwardly from opposite sides of the differential and through said apertures in said side plates, each of said jackshafts having a gear formed on its distal end and mating with the wheel drive gear, said jackshafts and said apertures being radially offset from said horizontal axis a predetermined distance as determined by the mating relation between the gears, and wherein said aperture is located in one of a plurality of positions which are disposed on a pair of diametrically opposite arcs of a circle having said horizontal axis as its center and said predetermined distance as its radius with one of said arcs being disposed forwardly of said horizontal axis.

2. The differential and wheel drive arrangement of claim 1 wherein said differential is disposed forwardly of the horizontal axis and said apertures are located in said one arc disposed forwardly of the horizontal axis.

3. The differential mounting and wheel drive arrangement of claim 2 wherein said one plate to which the differential is secured is said vertical plate.

4. A wheel drive arrangement for driving a pair of wheels of a lift truck comprising;

an axle beam having a pair of vertically spaced upper and lower plates, a pair of side plates individually secured to the ends of the upper and lower plates, and a vertically disposed plate secured to the forward edges of the upper and lower plates;

a pair of wheel spindles individually secured to the outer surfaces of the side plates with each of such wheels being rotatably mounted on one of said spindles, said spindles having a horizontal axis extending therethrough with said horizontal axis being disposed rearwardly of the vertical plate; and wheel drive means drivingly connected to the wheels and mounted within the axle beam, said wheel drive means having its centerline ahead of the horizontal axis of the spindle.

5. The wheel drive arrangement of claim 4 including a pair of wheel hubs individually rotatably mounted on said spindles with each of said wheels being mounted to said hub, said hub having a ring gear formed as an integral part thereof, and wherein said wheel drive means includes a differential mounted to said vertical plate and a pair of jackshafts extending from said differential, with each jackshaft having a gear formed on its distal end in meshing engagement with the respective ring gear.

* * * * *